United States Patent [19]

Mintgen

[11] Patent Number: 4,896,587
[45] Date of Patent: Jan. 30, 1990

[54] CYLINDER-PISTON DEVICE

[75] Inventor: Rolf Mintgen, Thür, Fed. Rep. of Germany

[73] Assignee: Stabilus GmbH, Koblenz-Neuendorf, Fed. Rep. of Germany

[21] Appl. No.: 217,567

[22] Filed: Jul. 11, 1988

[30] Foreign Application Priority Data

Jul. 23, 1987 [DE] Fed. Rep. of Germany ....... 3724370

[51] Int. Cl.[4] .............................................. F16J 15/18
[52] U.S. Cl. ..................................... 92/165 R; 277/3; 277/27; 267/64.11; 267/129; 188/322.17
[58] Field of Search ................. 92/81, 83, 142, 165 R, 92/180, 181, 182, 185, 168; 74/18.2; 277/3, 27; 267/64.11, 64.15, 120, 129; 188/322.17

[56] References Cited

U.S. PATENT DOCUMENTS

| | | | |
|---|---|---|---|
| 4,070,946 | 1/1978 | Sandvik et al. | 92/165 R |
| 4,070,947 | 1/1978 | Crewse | 92/165 R |
| 4,108,423 | 8/1978 | Skubal | 267/64.15 |
| 4,240,619 | 12/1980 | Wirges et al. | 267/129 |
| 4,342,447 | 8/1982 | Marx | 277/3 |
| 4,548,389 | 10/1985 | Smith et al. | 267/64.11 |
| 4,588,054 | 5/1986 | LeBaron | 92/185 |
| 4,613,140 | 9/1986 | Knox | 277/3 |
| 4,736,824 | 4/1988 | Dony et al. | 92/168 |

FOREIGN PATENT DOCUMENTS

| | | |
|---|---|---|
| 1116950 | 11/1961 | Fed. Rep. of Germany . |
| 1905304 | 8/1970 | Fed. Rep. of Germany ...... 267/129 |
| 2248156 | 4/1973 | Fed. Rep. of Germany . |
| 2332869 | 1/1975 | Fed. Rep. of Germany ...... 188/322.17 |
| 2442731 | 3/1976 | Fed. Rep. of Germany ........ 92/168 |
| 3503537 | 2/1985 | Fed. Rep. of Germany . |
| 1156365 | 6/1958 | France . |
| D15082 | 11/1960 | Luxembourg . |
| 2179411 | 3/1987 | United Kingdom ............. 267/64.11 |
| WO8600966 | 2/1986 | World Int. Prop. O. . |

*Primary Examiner*—Robert E. Garrett
*Assistant Examiner*—Thomas Denion
*Attorney, Agent, or Firm*—Brumbaugh, Graves, Donohue & Raymond

[57] ABSTRACT

In a gas spring the piston rod passes through a guide ring at one end of a container. On the inner side of the guide ring there are provided two sealing rings, a first axially outer sealing ring adjacent to the guide ring and a second axially inner sealing ring spaced from the first sealing ring. A working chamber is defined axially between the second sealing ring and the second end of the container. Pressurized gas is contained within the working chamber. An annular sealing chamber is defined axially between the first and the second sealing ring. Both sealing rings are provided with a respective radially inner sealing lip sealingly engaging the piston rod and a radially outer sealing lip sealingly engaging the container. Respective sealing lips are axially directed towards the sealing chamber. A volume of pressurized gas is contained within the sealing chamber. The pressure within the sealing chamber exceeds the pressure within the working chamber.

13 Claims, 1 Drawing Sheet

U.S. Patent      Jan. 30, 1990      4,896,587
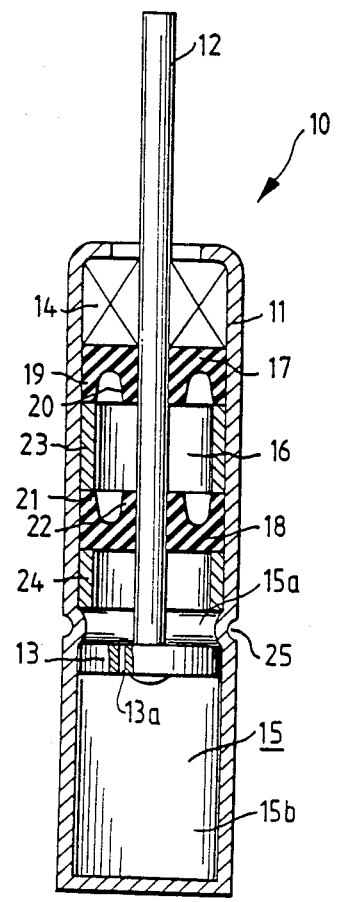

CYLINDER-PISTON DEVICE

BACKGROUND OF THE INVENTION

In cylinder-piston devices in which a pressurized fluid is contained within the container there is a problem of reliably sealing the piston rod with respect to the end of the container through which the piston rod passes.

This invention relates to an improvement of the sealing means between the container and the piston rod in such a cylinder-piston device.

STATEMENT OF THE PRIOR ART

In German Offenlegungsschrift 35 03 537 a sealing chamber is established adjacent to a piston rod guiding ring between an axially outer sealing ring and an axially inner sealing ring. This sealing chamber is filled with a liquid. The axially inner sealing ring is axially biased towards the axially outer sealing ring by a mechanical spring supported by a supporting bulge of the container. When the liquid within the sealing chamber slowly escapes, the mechanical spring maintains the pressure of the liquid within the sealing chamber. So, the sealing function is maintained during an extended lifetime.

OBJECT OF THE INVENTION

It is a primary object of the present invention to provide a cylinder piston unit of simplified and economic design, in which the pressure within a sealing chamber is maintained over an extended lifetime. More particularly mechanical springs for maintaining the pressure within the sealing chamber should be avoided.

SUMMARY OF THE INVENTION

A cylinder-piston device comprises a cylindrical container having an axis and two ends and defining a cavity therein. Piston rod guiding means are provided adjacent to at least a first one of said two ends. A piston rod member is guided by the piston rod guiding means inwards and outwards of the container along the axis thereof. Sealing means are provided adjacent to the piston rod guiding means. These sealing means comprise an axially outer sealing unit and an axially inner sealing unit. A sealing chamber is defined axially between the axially outer and the axially inner sealing units. Both the axially outer and the axially inner sealing units comprise a respective sealing ring member. These sealing ring members are in sealing engagement with both an internal circumferential face of the container and an external circumferential face of the piston rod member. A working chamber is defined axially between the axially inner sealing unit and the second end of the container. The working chamber contains a volume of pressurized fluid. Each of said sealing ring members has a radially outer sealing lip sealingly engaging said internal circumferential face and a radially inner sealing lip sealingly engaging said external circumferential face. Respective sealing lips of the sealing ring members extend in opposite axial directions towards said sealing chamber. The sealing chamber receives a volume of pressurized gas. The pressure of this volume of pressurized gas within the sealing chamber exceeds the pressure of the pressurized fluid within said working chamber.

In the cylinder-piston device of this invention the sealing effect of both sealing ring members is independent of the pressure within the working chamber. The pressure within the sealing chamber is at least after manufacturing and during an early period of the lifetime greater than the pressure within the working chamber. This may change later. However, even after the pressure difference has disappeared, a high sealing action is still warranted.

The pressure of the gas within the sealing chamber acts radially onto the sealing lips and urges the sealing lips radially against the respective circumferential faces. Such, the escape of pressurized gas from the sealing chamber is prevented in both axial directions. Simultaneously, the escape of gas from the working chamber towards the sealing chamber is prevented as long as the pressure within the sealing chamber is higher than the pressure within the working chamber. Even when the pressure in the sealing chamber decreases, there exists still the sealing action of the axially outer sealing ring member analogously to usual sealing systems. As compared with known sealing systems in which sealing rings have equidirectionally extending sealing lips the sealing system of the present invention has the advantage that each sealing ring is subject to a well-defined pressure difference.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

In the enclosed drawing a gas spring is shown which realizes the principles of this invention.

DESCRIPTION OF THE PREFERRED EMBODIMENT

The gas spring 10 as represented in the single Figure consists essentially of a container tube 11 in which a piston rod 12 with a piston 13 secured thereto can be driven in and out. The piston rod 12 is conducted out of the container tube 11 in a piston rod guide 14.

The container tube 11 is divided into a working chamber 15 and a sealing chamber 16. The sealing chamber 16 is sealed off to the exterior, that is in the region of the piston rod guide 14, by an outer sealing ring member 17 and to the working chamber 15 by an inner sealing ring member 18. The outer sealing ring member 17 comprises a radially outer, inwardly pointing, sealing lip 19 which rests on the inner wall of the container tube 11. Moreover the outer sealing ring member 17 comprises a radially inner, axially inwardly pointing sealing lip 20 which rests in sealing manner on the surface of the piston rod 12.

The inner sealing ring member 18 has a radially outer, axially outwardly pointing sealing lip 21 and a radially inner, axially outwardly pointing sealing lip 22. The sealing lips 19 and 20 of the outer sealing ring member 17 and the sealing lips 21 and 22 of the inner sealing ring member 18 are arranged facing one another across the sealing chamber 16. An outer support ring 23 is arranged in the sealing chamber 16 between the outer sealing ring member 17 and the inner sealing ring member 18.

On the inner side facing away from the sealing chamber 16 the inner sealing ring member 18 is supported with an inner support ring 24 which is made fast on a corrugation 25. The corrugation is at the same time the outer stop for the piston rod 12 and the piston 13 in outward movement.

The piston 13 subdivides the working chamber 15 into partial working chambers 15a and 15b which are in communication through a throttled passage 13a. The working chamber 15 is filled with a pressurized gas. Also the sealing chamber 16 is filled with a pressurized gas. The pressure of the pressurized gas within the sealing chamber 16 exceeds the pressure of the pressurized gas within the working chamber 15 at least after completing the gas spring and during a long-lasting early lifetime period of the gas spring.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A cylinder-piston device comprising a cylindrical container (11) having an axis and two ends and defining a cavity (15, 16) therein, piston rod guiding means (14) provided adjacent to at least a first one of said two ends, a piston rod member (12) guided by said piston rod guiding means (14) inwards and outwards of said container (11) along said axis of said container (11), sealing means (17, 18) adjacent to said piston rod guiding means (14), said sealing means (17, 18) comprising an axially outer sealing unit (17) and an axially inner sealing unit (18), a sealing chamber (16) being defined axially between said axially outer (17) and said axially inner (18) sealing units, both said axially outer (17) and said axially inner (18) sealing units comprising a respective sealing ring member (17, 18), said sealing ring members (17, 18) being in sealing engagement with both an internal circumferential face of said container (11) and an external circumferential face of said piston rod member (12), a working chamber (15) being defined axially between said axially inner sealing unit (18) and the second end of said container (11), said working chamber (15) containing a volume of pressurized fluid, each of said sealing ring members (17, 18) having a radially outer, axially pointing sealing lip (19, 21) sealingly engaging said internal circumferential face and a radially inner, axially pointing sealing lip (20, 22) sealingly engaging said external circumferential face, respective sealing lips (19, 20, 21, 22) of said sealing ring members (17, 18) extending in opposite axial directions towards said sealing chamber (16), said sealing chamber (16) receiving a volume of pressurized gas, the pressure of said volume of pressurized gas within said sealing chamber (16) exceeding the pressure of said pressurized fluid within said working chamber (15), said pressure within the sealing chamber being exerted on the sealing ring lips causing the sealing ring to exert pressure on the outer surface of the piston rod member and inner wall of the cylindrical container thereby sealing said volume of pressurized gas within said sealing chamber.

2. A cylinder-piston device as set forth in claim 1, at least one of said sealing ring members (17, 18) having an axially directed end face directed towards said sealing chamber (16), said radially inner (20, 22) and said radially outer (19, 21) sealing lip being defined by an annular recess of said at least one sealing ring member (17, 18) about said axis.

3. A cylinder-piston device as set forth in claim 2, said annular recess having - when regarded in a longitudinal cross-section containing said axis - a substantially parabolic contour.

4. A cylinder-piston device as set forth in claim 1, said sealing ring members (17, 18) being axially spaced by a spacer ring (23) adjacent to said internal circumferential surface.

5. A cylinder-piston device as set forth in claim 1, said axially outer sealing ring member (17) being supported in axially outward direction by said piston rod guiding means (14), said axially inner sealing ring member (18) being axially outwardly supported by said axially outer sealing ring member (17) through a spacer ring (23), and said axially inner sealing ring member (18) being axially inwardly supported by radially inwardly directed bulge means (25) of said container (11).

6. A cylinder-piston device as set forth in claim 5, a further spacer ring (24) being provided axially between said axially inner sealing ring member (18) and said bulge means (25).

7. A cylinder-piston device as set forth in claim 1, said body of fluid within said working chamber (15) comprising a body of pressurized gas.

8. A cylinder-piston device as set forth in claim 1, said sealing chamber (16) containing a lubricant agent.

9. A cylinder-piston device as set forth in claim 1, said working chamber (15) containing a lubricant agent.

10. A cylinder-piston device as set forth in claims 8 or 9, said lubricant agent being a liquid lubricant agent.

11. A cylinder-piston device as set forth in claim 1, said piston rod (12) carrying a piston unit (13) within said working chamber (15), said piston unit (13) subdividing said working chamber (15) into two partial working chambers (15a, 15b), said partial working chambers (15a, 15b) being interconnected by a flow passage (13a) by-passing said piston unit (13).

12. A cylinder-piston device as set forth in claim 1, said piston cylinder unit (13) being a pneumatic spring.

13. A cylinder-piston device comprising a cylindrical container (11) having an axis and two ends and defining a cavity (15, 16) therein, piston rod guiding means (14) provided adjacent to at least a first one of said two ends, a piston rod member (12) guided by said piston rod guiding means (14) inwards and outwards of said container (11) along said axis of said container (11), sealing means (17, 18) adjacent to said piston rod guiding means (14), said sealing means (17, 18) comprising an axially outer sealing unit (17) and an axially inner sealing unit (18) both fixed in an axial direction with respect to said cylindrical container (11), a sealing chamber (16) being defined axially between said axially outer (17) and said axially inner (18) sealing units, both said axially outer (17) and said axially inner (18) sealing units comprising a respective sealing ring member (17, 18), said sealing ring members (17, 18) being in sealing engagement with both an internal circumferential face of said container (11) and an external circumferential face of said piston rod member (12), a working chamber (15) being defined axially between said axially inner sealing unit (18) and the second end of said container (11), said working chamber (15) containing a volume of pressurized fluid, each of said sealing ring members (17, 18) having a radially outer, axially pointing sealing lip (19, 21) sealingly engaging said internal circumferential face and a radially inner, axially pointing sealing lip (20, 22) sealingly engaging said external circumferential face, respective sealing lips (19, 20, 21, 22) of said sealing ring members (17, 18) extending in opposite axial directions towards said sealing chamber (16), said sealing chamber (16) receiving a volume of pressurized gas, the pressure of said volume of pressurized gas within said sealing chamber (16) exceeding the pressure of said pressurized fluid within said working chamber (15), said pressure within the sealing chamber being exerted on the sealing ring lips causing the sealing ring to exert pressure on the outer surface of the piston rod member and inner wall of the cylindrical container thereby sealing said volume of pressurized gas within said sealing chamber.

* * * * *